(12) United States Patent
Brown et al.

(10) Patent No.: US 8,143,365 B2
(45) Date of Patent: *Mar. 27, 2012

(54) FORMULATIONS FOR REACTION INJECTION MOLDING AND FOR SPRAY SYSTEMS

(75) Inventors: William R. Brown, Baton Rouge, LA (US); Paul L. Wiggins, Baton Rouge, LA (US); John Y. Lee, Baton Rouge, LA (US)

(73) Assignee: Albemarle Corporation, Richmond, VA (US)

( * ) Notice: Subject to any disclaimer, the term of this patent is extended or adjusted under 35 U.S.C. 154(b) by 117 days.

This patent is subject to a terminal disclaimer.

(21) Appl. No.: 12/444,870

(22) PCT Filed: Jan. 9, 2008

(86) PCT No.: PCT/US2008/050659
§ 371 (c)(1),
(2), (4) Date: Feb. 16, 2010

(87) PCT Pub. No.: WO2008/086437
PCT Pub. Date: Jul. 17, 2008

(65) Prior Publication Data
US 2010/0160592 A1 Jun. 24, 2010

Related U.S. Application Data

(60) Provisional application No. 60/884,293, filed on Jan. 10, 2007.

(51) Int. Cl.
C08G 18/32 (2006.01)
B05D 1/02 (2006.01)
(52) U.S. Cl. ............... 528/68; 427/427.4; 264/328.6
(58) Field of Classification Search .............. None
See application file for complete search history.

(56) References Cited

U.S. PATENT DOCUMENTS

| | | |
|---|---|---|
| 2,380,420 A | 7/1945 | Emerson |
| 2,497,292 A | 2/1950 | Bruner |
| 2,582,128 A | 1/1952 | Hurwitz et al. |
| 2,953,579 A | 9/1960 | Williams et al. |
| 2,965,605 A | 12/1960 | Reynolds et al. |
| 3,209,030 A | 9/1965 | Bicek |
| 3,275,567 A | 9/1966 | Keith et al. |
| 3,336,386 A | 8/1967 | Dovell et al. |
| 3,350,450 A | 10/1967 | Dovell et al. |
| 3,414,616 A | 12/1968 | Summers |
| 3,519,603 A | 7/1970 | Lohse et al. |
| 3,538,161 A | 11/1970 | Dovell |
| 3,609,121 A | 9/1971 | Allschwil et al. |
| 3,625,710 A | 12/1971 | Rizzi |
| 3,658,937 A | 4/1972 | Terni et al. |
| 3,761,425 A | 9/1973 | Baessler et al. |
| 3,937,730 A | 2/1976 | Vogel et al. |
| 3,943,158 A | 3/1976 | Dietrich et al. |
| 3,952,056 A | 4/1976 | Vogel et al. |
| 3,994,975 A | 11/1976 | Oude Alink et al. |
| 4,045,486 A | 8/1977 | Krall et al. |
| 4,140,718 A | 2/1979 | Symon |
| 4,161,492 A | 7/1979 | Weissel |
| 4,317,916 A | 3/1982 | Degischer et al. |
| 4,373,107 A | 2/1983 | Tahara et al. |
| 4,520,186 A | 5/1985 | Hess et al. |
| 4,521,624 A | 6/1985 | Jackisch |
| 4,528,363 A | 7/1985 | Tominaga |
| 4,631,298 A | 12/1986 | Presswood |
| 4,663,201 A | 5/1987 | House et al. |
| 4,714,512 A | 12/1987 | House et al. |
| 4,760,183 A | 7/1988 | Papenfuhs et al. |
| 4,789,691 A | 12/1988 | Matzke et al. |
| 4,798,862 A | 1/1989 | Gillis, Jr. |
| 4,806,616 A * | 2/1989 | Baumann et al. ............... 528/68 |
| 4,900,868 A | 2/1990 | Merten et al. |
| 4,925,974 A | 5/1990 | Gras |
| 5,001,267 A | 3/1991 | Speranza et al. |
| 5,002,806 A | 3/1991 | Chung |
| 5,008,453 A | 4/1991 | Nalepa et al. |
| 5,041,668 A | 8/1991 | Nalepa et al. |
| 5,059,672 A | 10/1991 | Engebretson |
| 5,145,825 A | 9/1992 | Deeba et al. |
| 5,312,886 A | 5/1994 | House et al. |
| 5,430,188 A | 7/1995 | Bader et al. |

(Continued)

FOREIGN PATENT DOCUMENTS

CA 1218190 A 2/1987

(Continued)

OTHER PUBLICATIONS

ETHACURE 100 Brochure 2001.*
CLEARLINK 100 "Dorf Ketal" pp. 1-5.*
Adams et al., "Restricted Rotation in Aryl Amines. XIV. Isopropyl Derivatives of Dibenzenesulfonamidomesitylene", J. Am. Chem. Soc., 1950, pp. 5077-5079, vol. 72.
Arunajatesan, V., et al., "Optimization of Reductive Alkylation Catalysts by Experimental Design", Organic Reactions Catalysis Society, 2003, pp. 1-6.
Arunajatesan, V., et al., "Optimization of Reductive Alkylation Catalysts by Experimental Design", Chemical Industries (CRC Press), vol. 115, Catalysis of Organic Reactions), 2007, pp. 481-487.

(Continued)

*Primary Examiner* — Randy Gulakowski
*Assistant Examiner* — Jeffrey Washville
(74) *Attorney, Agent, or Firm* — James A. Jubinsky

(57) ABSTRACT

This invention provides articles made by reaction injection molding and spray coatings, and processes for forming such articles and coatings. The coatings and articles are polyureas or polyurea-urethanes. The ingredients used to form the coatings and articles comprise at least (A) an aromatic polyisocyanate and (B) a mixture formed from components comprised of (i) at least one polyol and/or at least one polyetheramine, (ii) an aromatic primary diamine, and (iii) an aliphatic secondary diamine which has about twelve to about forty carbon atoms and in which the having amino hydrocarbyl groups are secondary or tertiary hydrocarbyl groups.

16 Claims, No Drawings

U.S. PATENT DOCUMENTS

| | | | |
|---|---|---|---|
| 5,470,890 | A | 11/1995 | House et al. |
| 5,498,585 | A | 3/1996 | Bartels et al. |
| 5,591,807 | A | 1/1997 | Cai et al. |
| 5,616,677 | A | 4/1997 | Primeaux, II et al. |
| 5,616,799 | A | 4/1997 | Planker et al. |
| 5,646,235 | A | 7/1997 | Zimmerman et al. |
| 5,731,397 | A * | 3/1998 | Primeaux et al. ............... 528/73 |
| 5,744,642 | A | 4/1998 | Lantzsch et al. |
| 5,847,067 | A | 12/1998 | Gras |
| 5,859,164 | A | 1/1999 | Gras et al. |
| 5,874,619 | A | 2/1999 | Wiggins et al. |
| 6,013,755 | A | 1/2000 | Primeaux, II et al. |
| 6,103,799 | A | 8/2000 | Lassila et al. |
| 6,156,863 | A | 12/2000 | Wenning |
| 6,218,480 | B1 | 4/2001 | Rappoport |
| 6,399,736 | B1 | 6/2002 | Primeaux, II et al. |
| 6,403,752 | B1 | 6/2002 | House et al. |
| 6,429,338 | B1 | 8/2002 | Burdeniuc et al. |
| 6,444,721 | B2 | 9/2002 | Schwalm et al. |
| 6,803,445 | B2 | 10/2004 | Ishikawa et al. |
| 7,288,677 | B2 | 10/2007 | Lee et al. |
| 7,767,858 | B2 | 8/2010 | Wiggins et al. |
| 2002/0028901 | A1 | 3/2002 | Gunatillake et al. |
| 2003/0004265 | A1 | 1/2003 | Gupta et al. |
| 2004/0015016 | A1 | 1/2004 | Su et al. |
| 2004/0019238 | A1 | 1/2004 | Su et al. |
| 2004/0054150 | A1 | 3/2004 | Murray |
| 2004/0167311 | A1 | 8/2004 | Slagel et al. |
| 2004/0171786 | A1 * | 9/2004 | Klein et al. ..................... 528/61 |
| 2004/0180778 | A1 | 9/2004 | Small |
| 2007/0066786 | A1 | 3/2007 | Hanson, Jr. |
| 2007/0073030 | A1 | 3/2007 | Wiggins et al. |
| 2007/0270566 | A1 | 11/2007 | Lee et al. |
| 2008/0004406 | A1 | 1/2008 | Lee et al. |
| 2008/0194788 | A1 | 8/2008 | Lee et al. |

FOREIGN PATENT DOCUMENTS

| | | |
|---|---|---|
| EP | 0288067 A1 | 10/1988 |
| EP | 0309980 A1 | 4/1989 |
| EP | 0420426 A2 | 4/1991 |
| EP | 0469751 A1 | 2/1992 |
| EP | 0688802 A1 | 12/1995 |
| EP | 0779278 A3 | 6/1997 |
| EP | 0802209 A1 | 10/1997 |
| EP | 1067116 A1 | 1/2001 |
| EP | 1229020 A | 8/2002 |
| EP | 0802209 B1 | 4/2003 |
| GB | 1070759 | 6/1967 |
| GB | 1320863 | 6/1973 |
| GB | 1478446 | 6/1977 |
| JP | 09100260 A | 4/1997 |
| WO | 92/18575 A1 | 10/1992 |
| WO | 97/01529 | 1/1997 |
| WO | 02/102869 A1 | 12/2002 |
| WO | WO 02/102869 A1 | 12/2002 |
| WO | 03/018531 A1 | 3/2003 |
| WO | 2004/073634 A2 | 9/2004 |
| WO | 2004/092632 A2 | 10/2004 |
| WO | WO 2004/092632 A2 | 10/2004 |
| WO | 2005/033119 | 4/2005 |
| WO | 2006/028728 A1 | 3/2006 |
| WO | 2006/104528 A1 | 10/2006 |
| WO | 2007/050542 A1 | 5/2007 |

OTHER PUBLICATIONS

Barmettler, "Acid-Catalyzed [3.3]-Sigmatropic Rearrangements of N-Propargylanilines", Helvetica Chimica Acta, 1990, pp. 1515-1573, vol. 73, Verlag Helvetica Chimica Acta, Basel, CH.

Billaud et al., "Quantitative Analysis of Epoxy Resin Cure Reaction: A Study by Near-Infrared Spectroscopy", Applied Spectroscopy, 2002, pp. 1413-1421, vol. 56(11).

Borges-Lopes et al., "Synthesis and Characterization of New Methyl-Substituted Azomethine-Siloxane Liquid Crystal Macrocycles Influence of the Methyl-Substitution on the Cycle Formation", Polymer Bulletin, 1995, pp. 523-530, vol. 34, Springer, Heidelberg, Berlin, DE.

Campbell et al., "The Preparation of Unsymmetrical Secondary Aliphatic Amines", J. Am. Chem. Soc., 1944, pp. 82-84, vol. 66.

Childs et al., "Assembly of a Nanoscale Chiral Ball Through Supramolecular Aggregation of Bowl-Shaped Triangular Helicates", Angewandte Chemie, 2002, pp. 4244-4247, vol. 41, VCH Verlagsgesellschaft, Weinheim, DE.

Childs et al., "Using Noncovalent Intra-strand and Inter-strand Interactions to Prescribe Helix Formation within a Metallo-supramolecular System", Chem. Eur. J., 2004, pp. 4291-4300, vol. 10(17).

De, D., et al., "Polyurethanes With a Diamine-Diamide Chain Extender", Polymer Preprints, 2007, 48(1), 485-486.

Deschenaux et al., "Structural Isomerism in Polycondensates. IV. Synthesis and Characterization of Liquid Crystalline Poly(azomethines) and Low Molecular Weight Model Compounds", Helvetica Chimica Acta, 1986, pp. 1349-1355, vol. 69(6).

Distefano, "Reinvestigation of the Formaldehyde-Aniline Condensation. Part 4. Ultraviolet Photoelectron and Electron Transmission Spectra of N-Methyleneaniline and its Symmetric Dimethyl Ring-substituted Homologues and Semiempirical Theoretical Evaluations", J. Chem. Soc. Perkin Trans II, 1985, pp. 1623-1627.

Dovell & Greenfield, "Platinum Metal Sulfides as Heterogeneous Hydrogenation Catalysts", J. Am. Chem. Soc., 1965, pp. 2767-2768, vol. 87.

Dvolaitzky et al., "Stable N,N'-di-tert-butyl-meta-phenylenebisnitroxides—Unexpected Ground-State Singlets", Angewandte Chemie Int. Ed. Engl., 1992, pp. 180-181, vol. 31(2).

Emerson et al., "The Reductive Alkylation of Hindred Aromatic Primary Amines", J. Am. Chem. Soc., 1941, pp. 972-974, vol. 63.

Hine, et al., "Polar Effects on the Formation of Imines from Isobutyraldehyde and Primary Aliphatic Amines", The Journal of Organic Chemistry, 1970, pp. 340-344, vol. 85.

Jie et al., "Bridged Bis-Pyridinylimino Dinickel (II) Complexes: Syntheses, Characterization, Ethylene Oligomerization and Polymerization", Journal of Organometallic Chemistry, 2005, pp. 1739-1749, vol. 690, Elsevier-Sequoia S.A. Lausanne, CH.

Klebanskii, A. L., et al., "Synthesis and Polycondensation of N-alkyl Derivatives of Hexamethylenediamine. I. Synthesis of N,N'-dialkyl Derivatives of Hexamethylenediamine", Zhurnal Obshchei Khimii, 1958, 28, 1066-72. CAPLUS abstract 1958:103796, 1 page.

Lai, J.T., "Ketoform Reaction. Synthesis of Hindered Imines from 2,6-dialkylanilines and Ketones", Tetrahedron Letters, 2002, p. 1965-1967; 1996, vol. 43, Elsevier Science Publishers, Amsterdam, NL.

Layer, Robert W.; "The Chemistry of Imines", Chemical Reviews; 1963; vol. 63; pp. 489-510.

Luo et al., "New Bi-nuclear and Multi-nuclear α-diimine/nickel Catalysts for Ethylene Polymerization", Journal of Molecular Catalysts, 2005, pp. 153-161, vol. 227.

March, "Reactions, Mechanisms, and Structure", Advanced Organic Chemistry, 1992, pp. 896-900, 4th Ed., John Wiley & Sons, US.

Mi et al., "Homo- and Copolymerization of Norbornene and Styrene with Pd- and Ni-Based Novel Bridged Dinuclear Diimine Complexes and MAO",Macromol. Chem. Phys., 2003, pp. 868-876, vol. 204(5/6).

Mylroie, Victor L., et al., "Reductive Alkylation Optimized by Techniques of Experimental Design", Catalysis of Organic Reactions, Chem. Ind. Series, vol. 68, Marcel Dekker, New York, 1996, pp. 301-312.

Pal et al., "Schiff Base Linked Ferrocenyl Complexes for Second-Order Nonlinear Optics", Journal of Organometallic Chemistry, 2000, pp. 248-259, vol. 604, Elsevier-Sequoia S.A., Lausanne, CH.

Parker, et al., "Reaction Chemistry of Tri-Substituted Mesitylene derivatives and the Synthesis of Sterically Buttressed 1,3,5-triaminocyclohexyl Ligands", J. Chem. Soc., Perkin Transactions 2, Chemical Society, 1997, pp. 1445-1452.

Patai, The Chemistry of the Carbon-Nitrogen Double Bond, 1970, pp. 61-67, 130, 255-256, 276-293, 296-298, Interscience Publishers, Great Britain.

Perez, Jr. et al., "Performance and Processing Enhancements of Aromatic Polyurea Elastomer Systems Prepared from High 2,4'-MDI Isocyanates", Huntsman Corporation; 3 pages.

Posey et al., "New Secondary Amine Chain Extenders for Aliphatic Polyurea Materials", Polyurea Development Association 2003 Annual Conference, Aug. 19-21, 2003, John Ascuaga's Nugget Casino Resort, Reno, NV; 11 pages.

Rylander, "Reduction Alkylation", Catalytic Hydrogenation in Organic Syntheses, 1979, pp. 165-174, Academic Press, New York, NY, USA.

Smith et al., "Preparation of Polyimides Utilizing the Diels-Alder Reaction. 1,4-N,N'-Bis(Butadienyl-2-Methyl) Diamido)-2,3,5,6-tetramethylbenzenes with Bismaleimides", Macromolecules, American Chemical Society, 1996, pp. 1123-1130, vol. 29, Easton, US.

Sun et al., "Supramolecular Helical Architecture Assembled by Double-Helical [Ag2L2] Units", Journal of Organometallic Chemistry, 2004, pp. 43-49, vol. 689.

Taneda et al., "Photochromism of Polymorphic 4, 4'-methylenebis-(N-salicylidene-2, 6-diisopropylaniline) Crystals", Org. Biomol. Chem., 2004, pp. 499-504, vol. 2(4).

Trost et al., "Dehydrogenation of Amines. An approach to Imines and Aldehydes", The Journal of Organic Chemistry, 1981, pp. 4617-4620, vol. 46.

Voigt-Martin et al., "Structure and Defects in Sanidic Liquid Crystalline Polymers. 2. Structure Analysis of Sanidic Polymers by Simulation of Diffraction Patterns From Monomeric Analogs", Macromolecules, 1995, pp. 243-254, vol. 28 (1).

CAPLUS Abstract of Vasilenko et al., "Electron Spectra and Structure of Molecules Containing a Carbon:Nitrogen Group. II. Absorption Spectra of Benzyideneaniline Derivatives and Bis(azomethines)", Zhurnal Fizicheskoi Khimii; 1976; 50(3); pp. 597-601; Accession No. 1976:405028.

CAPLUS Abstract of Zhang et al., "Synthesis of Bis-(salicylaldininato) Nickel Complexes and Their Catalytic Behavior for Vinyl Polymerization of Norbornene"; Gaofenzi Xuebao; 2004; (5); pp. 758-762; Accession No. 2004:985377.

Johnson Matthey Catalysts & Chemicals Division, Heterogeneous Catalyst Application Table.

Pamphlet, 2001, Albemarle Corporation, ETHACURE 100-LC CURATIVE, 2-pages.

Wang, et al., "Bolaamphiphilic Single-Chain Bis-Schiff Base Derivatives: Aggregation and Thermal Behavior in Aqueous Solution", Langmuir, 2001, vol. 17, pp. 3162-3167.

* cited by examiner

FORMULATIONS FOR REACTION INJECTION MOLDING AND FOR SPRAY SYSTEMS

REFERENCE TO RELATED APPLICATIONS

This application is the National Stage of International Patent Application PCT/US2008/050659, filed on Jan. 9, 2008, which application claims priority from U.S. Application No. 60/884,293, filed Jan. 10, 2007, the disclosures of which are incorporated herein by reference.

TECHNICAL FIELD

This invention relates to formulations to make polyureas and polyurea-urethanes via reaction injection molding or via spray systems.

BACKGROUND

In the preparation of polyurea and polyurethane-urea polymers, there are many polyfunctional compounds which are indicated to be useful as chain extenders, including diols and aromatic diamines. None of these compounds has a reactivity such as to make it universally ideal, and many fail to provide satisfactory properties in the products made by their use. Thus, there is still a need to find compounds capable of serving as chain extenders or curing agents. U.S. Pat. No. 4,806,616 teaches the use of certain N,N'-dialkylphenylenediamines as chain extenders in preparing polyurethanes and polyureas. In this connection, also see for example U.S. Pat. No. 4,528,363, which teaches the use of secondary aliphatic diamines as part of a resin binder, and U.S. Pat. No. 6,218,480 B1, which discloses use of aromatic diamines as hardeners for polyurethane-ureas.

Polyurethane, polyurea, and polyurethane-urea polymers are used in spray coatings and in reaction injection molding. Spray coatings find application in concrete coatings, building coatings, secondary containment coatings, parking deck coatings, moisture seal coatings, blast abatement coatings, roof coatings, bridge coatings, tunnel liners, pipe liners, manhole liners, truck bed liners, and the like. Reaction injection molding finds application in making body parts for automobiles, recreational vehicles, and farm equipment. In this connection, there is a need for a spray system incorporating a mixture of chain extenders which provides coatings that have acceptable physical properties via formulations having appropriate gel times. Similarly, there is a need for a reaction injection molding process incorporating a mixture of chain extenders which provides a reaction injection mixture that has an appropriate gel time, has suitable properties at demolding, and has acceptable physical properties.

SUMMARY OF THE INVENTION

This invention provides spray coatings and articles made by reaction injection molding, and processes for spray coating and for reaction injection molding using mixtures of chain extenders. It has been discovered that the use of certain mixtures of chain extenders provide polyureas and polyurea-urethanes having desirable physical properties. Thus, a feature of this invention is that, by appropriate selection of chain extenders, the reactivity and physical properties of the coating can be tailored depending on the particular characteristics desired.

An embodiment of this invention is a spray coating which is formed from ingredients comprising at least (A) an aromatic polyisocyanate; and (B) a mixture formed from components comprised of
(i) at least one polyol and/or at least one polyetheramine,
(ii) an aromatic primary diamine, and
(iii) an aliphatic secondary diamine which has about twelve to about forty carbon atoms and in which the having amino hydrocarbyl groups are secondary or tertiary hydrocarbyl groups.

Another embodiment of this invention is a process for forming a spray coating, which process comprises bringing together at least (A) an aromatic polyisocyanate; and (B) a mixture formed from components comprised of
(i) at least one polyol and/or at least one polyetheramine,
(ii) an aromatic primary diamine, and
(iii) an aliphatic secondary diamine which has about twelve to about forty carbon atoms and in which the having amino hydrocarbyl groups are secondary or tertiary hydrocarbyl groups.

Still another embodiment of this invention is an article formed by reaction injection molding, which article is formed from ingredients comprising at least (A) an aromatic polyisocyanate; and (B) a mixture formed from components comprised of
(i) at least one polyol and/or at least one polyetheramine,
(ii) an aromatic primary diamine, and
(iii) an aliphatic secondary diamine which has about twelve to about forty carbon atoms and in which the having amino hydrocarbyl groups are secondary or tertiary hydrocarbyl groups.

Yet another embodiment of this invention is a process for preparing a reaction injection molding product. The process comprises I) bringing together at least (A) an aromatic polyisocyanate and (B) a mixture formed from components comprised of (i), (ii), and (iii) to form a molding mixture; II) injecting the molding mixture formed in I) into a mold to form a molded product; and III) opening the mold and removing the product formed in II). In the mixture (B), (i), (ii), and (iii) as used in forming the mixture are as follows:
(i) at least one polyol and/or at least one polyetheramine,
(ii) an aromatic primary diamine, and
(iii) an aliphatic secondary diamine which has about twelve to about forty carbon atoms and in which the having amino hydrocarbyl groups are secondary or tertiary hydrocarbyl groups.

These and other embodiments and features of this invention will be still further apparent from the ensuing description and appended claims.

FURTHER DETAILED DESCRIPTION OF THE INVENTION

In this invention, the coatings and articles are polymers which are polyureas or polyurea-urethanes (sometimes called polyurea-polyurethanes). Similarly, the processes of this invention produce polymers which are polyureas or polyurea-urethanes.

To form a polyurethane-urea, a polyisocyanate, usually and preferably a diisocyanate, is reacted with a diol. To form a polyurea, a polyisocyanate (usually and preferably a diisocyanate) is reacted with a polyetheramine.

I. Ingredients

A. Aromatic Polyisocyanate

The aromatic polyisocyanates (A) in the coatings, articles, and processes of the present invention are organic polyisocyanates having at least two isocyanate groups. Generally, the isocyanates have a free —NCO content of at least about 0.1% by weight. Preferably, the isocyanates have a free —NCO content of at about 10% to about 35% by weight. Aromatic polyisocyanates that can be used in the practice of this invention include phenylene diisocyanate, toluene diisocyanate (TDI), xylene diisocyanate, 1,5-naphthalene diisocyanate, chlorophenylene 2,4-diisocyanate, bitoluene diisocyanate, dianisidine diisocyanate, tolidine diisocyanate, alkylated benzene diisocyanates, methylene-interrupted aromatic diisocyanates such as methylenediphenyl diisocyanates, especially 4,4-methylenediphenyl diisocyanate and 2,4-methylenediphenyl diisocyanate (MDI), alkylated analogs of methylene-interrupted aromatic diisocyanates (such as 3,3'-dimethyl-4,4'-diphenylmethane diisocyanate), and polymeric methylenediphenyl diisocyanates. Mixtures of two or more aromatic polyisocyanates can be used in the practice of this invention. Preferred aromatic polyisocyanates include 2,4-methylenediphenyl diisocyanate (MDI), 4,4-methylenediphenyl diisocyanate, and mixtures thereof. Examples of isocyanates that can be used are also taught in, for example, U.S. Pat. No. 4,595,742.

B. Polyols and Polyetheramines

Isocyanate-reactive polyols that are typically used in making polyurea-urethanes and polyetheramines (sometimes referred to as amine-terminated polyols) that are typically used in making polyureas and polyurea-urethanes range in molecular weight from about 60 to over 6,000. The polyols can be dihydric, trihydridic, or polyhydric polyols, but are usually dihydric. Examples of suitable polyols include poly(ethyleneoxy) glycols, dipropylene glycol, poly(propyleneoxy) glycols, dibutylene glycol, poly(butyleneoxy) glycols, and the polymeric glycol from caprolactone, commonly known as polycaprolactone. Mixtures of two or more polyols can be used in the practice of this invention. The polyetheramines used to make polyureas are amine-capped polyols which are the reaction product of a polyol and then an amine with alkylene oxides as well as amine-capped hydroxyl-containing polyesters. Mixtures of two or more polyetheramines can be used in the practice of this invention. Polyetheramines typically have a molecular weight of about 200 to about 6000. Several commercially available polyetheramines known as Jeffamines® available from Huntsman Chemical Company and include Jeffamine® T-5000, a polypropylene oxide triamine of about 5000 molecular weight, XTJ-509, a polypropylene oxide triamine of about 3000 molecular weight, XTJ-510, a polypropylene oxide diamine of about 4000 molecular weight, and Jeffamine® D-2000, a polypropylene oxide diamine of about 2000 molecular weight. Jeffamine® T-5000 and Jeffamine® D-2000 are preferred polyetheramines in the practice of this invention.

C. Chain Extenders

Components (ii) and (iii) are referred to collectively as chain extenders throughout this document. Chain extenders employed in this invention are made up of an aromatic primary diamine and an aliphatic secondary diamine which has about twelve to about forty carbon atoms and in which the amino hydrocarbyl groups are secondary or tertiary hydrocarbyl groups. The components can be present in the chain extender in a variety of proportions; the preferred ratios vary with the desired reactivity for forming a coating or article.

1. Component (ii)

Aromatic primary diamines are component (ii) of the chain extenders used in this invention.

One type of aromatic primary diamine that can be used in this invention is an aromatic primary diamine in which at least one position ortho to each amino group has a hydrogen atom as a substituent, and which aromatic primary diamine is either in the form of one phenyl ring having two amino groups on the ring or in the form of two phenyl rings connected by an alkylene bridge and having one amino group on each ring. The phenyl rings may have, but need not have, one or more hydrocarbyl groups on the phenyl ring(s). Hydrocarbyl groups, when present on the phenyl rings, may be the same or different. When both amino groups are on one phenyl ring, the amino groups may be in any position relative to each other on the ring; preferably, the amino groups are meta or para relative to each other. When the amino groups are on two phenyl rings connected by an alkylene bridge, they may be in any position on the rings; preferably, each amino group is meta or para relative to the alkylene bridge. The alkylene bridge of the two-ring diamine has from one to about six carbon atoms; preferably, the alkylene bridge has from one to about three carbon atoms. More preferably, the alkylene bridge has one or two carbon atoms; highly preferred is an alkylene bridge having one carbon atom. Hydrocarbyl groups, when present on the phenyl ring(s), may be the same or different. Examples of suitable hydrocarbyl groups on the aromatic ring include methyl, ethyl, propyl, isopropyl, n-butyl, sec-butyl, t-butyl, pentyl, cyclopentyl, hexyl, methylcyclohexyl, heptyl, octyl, cyclooctyl, nonyl, decyl, dodecyl, phenyl, benzyl, and the like. Preferred hydrocarbyl groups on the phenyl ring(s) (ortho to an imino group) of the aromatic diimines are straight-chain or branched-chain alkyl groups having from one to about six carbon atoms; particularly preferred hydrocarbyl groups are methyl, ethyl, isopropyl, butyl, and mixtures of two or more of these groups. Here, the preference for butyl groups includes n-butyl, sec-butyl, and t-butyl groups. When one or more hydrocarbyl groups are present on the phenyl ring(s), the hydrocarbyl groups can have from one to about twenty carbon atoms; preferably, the hydrocarbyl groups have from one to about six carbon atoms.

Suitable aromatic primary diamines of this type having both amino groups on one phenyl ring include, but are not limited to, 1,2-benzenediamine, 1,3-benzenediamine, 1,4-benzenediamine, 4-ethyl-1,2-benzenediamine, 2-isopropyl-1,3-benzenediamine, 4-tert-butyl-1,3-benzenediamine, 2-pentyl-1,4-benzenediamine, 4,5-dihexyl-1,2-benzenediamine, 4-methyl-5-heptyl-1,3-benzenediamine, 4,6-di-n-propyl-1,3-benzenediamine, 2,5-dioctyl-1,4-benzenediamine, 2,3-diethyl-1,4-benzenediamine, and 4,5,6-trihexyl-1,3-benzenediamine.

Examples of suitable aromatic primary diamines of this type in which one amino group is on each of two phenyl rings include 2,2'-methylenebis(benzeneamine), 2,3'-methylenebis-(benzeneamine), 2,4'-methylenebis(benzeneamine), 3,3'-methylenebis(benzeneamine), 3,4'-methylenebis(benzeneamine), 4,4'-methylenebis(benzeneamine), 4,4'-(1,2-ethanediyl)bis-(benzeneamine), 3,4'-(1,3-propanediyl)bis(benzeneamine), 2,2'-methylenebis(5-tert-butylbenzeneamine), 3,3'-methylenebis(2-methylbenzeneamine), 3,3'-methylenebis(5-pentylbenzeneamine), 3,3'-methylenebis(6-isopropylbenzeneamine), 4,4'-methylenebis(2-methylbenzeneamine), 4,4'-methylenebis(3-sec-butylbenzeneamine), 4,4'-(1,2-ethanediyl)bis(2-methylbenzeneamine), 3,3'-methylenebis(2,4-dipentylbenzeneamine), 3,3'-methylenebis(5,6-diisopropylbenzeneamine), 4,4'-methylenebis(2,3-di-sec-butylbenzeneamine), 4,4'-methylenebis(3,5-di-tert-butylbenzeneamine), and the like.

Another type of aromatic primary diamine that can be used in this invention, which is a preferred type of aromatic primary diamine, is an aromatic primary diamine in which each position ortho (immediately adjacent) to an amino group bears a hydrocarbyl group, and which aromatic primary diamine either is in the form of one phenyl ring having two amino groups on the ring, which amino groups are meta or para relative to each other, or is in the form of two phenyl rings connected by an alkylene bridge and having one amino group on each ring. The hydrocarbyl groups on the phenyl rings (adjacent to the amino groups) generally have up to about twenty carbon atoms, and the hydrocarbyl groups may be the same or different. The alkylene bridge of the two-ring primary diamine has from one to about six carbon atoms; preferably, the bridge has from one to about three carbon atoms. More preferably, the alkylene bridge has one or two carbon atoms; especially preferred as the alkylene bridge is a methylene group. Particularly preferred hydrocarbyl groups on the phenyl ring(s) are methyl, ethyl, isopropyl, butyl, and mixtures of two or more of these groups. Here, butyl groups include n-butyl, sec-butyl, and t-butyl groups.

More preferred aromatic primary diamines with two amino groups on one phenyl ring have the amino groups meta relative to each other. Highly preferred hydrocarbyl groups are methyl, ethyl, isopropyl, butyl, and mixtures thereof, where the preference for butyl groups includes n-butyl, sec-butyl, and t-butyl groups. Particularly preferred are aromatic primary diamines in which the hydrocarbyl group between the two meta amino groups is a methyl group, while the two remaining hydrocarbyl groups are ethyl groups, and those in which the hydrocarbyl group between the two meta amino groups is an ethyl group, while one of the two remaining hydrocarbyl groups is a methyl group and the other is an ethyl group, and mixtures thereof. More preferred aromatic primary diamines are also those in which one amino group is on each of two phenyl rings, where the two phenyl rings are connected via an alkylene bridge, and have both amino groups para relative to the alkylene bridge. An especially preferred aromatic primary diamine of this type is a compound where each hydrocarbyl group ortho to an amino group is an ethyl group and the alkylene bridge is a methylene group.

A preferred aromatic primary diamine is one in which each position ortho to an amino group bears a hydrocarbyl group, and which aromatic primary diamine is in the form of one phenyl ring having two amino groups on the ring, which amino groups are meta or para relative to each other, and in which the aromatic primary diamine has amino groups are meta relative to each other, and/or the ortho hydrocarbyl groups are methyl, ethyl, isopropyl, butyl, or mixtures thereof.

Examples of more preferred aromatic primary diamines include 3,6-di-n-butyl-1,2-benzenediamine, 2,4,6-triethyl-1,3-benzenediamine, 2,4-diethyl-6-methyl-1,3-benzenediamine, 4,6-diethyl-2-methyl-1,3-benzenediamine, 2,4-diisopropyl-6-methyl-1,3-benzenediamine, 2-methyl-4,6-di-sec-butyl-1,3-benzenediamine, 2-ethyl-4-isopropyl-6-methyl-1,3-benzenediamine, 2,3,5-tri-n-propyl-1,4-benzenediamine, 2,3-diethyl-5-sec-butyl-1,4-benzenediamine, 3,4-dimethyl-5,6-diheptyl-1,2-benzenediamine, 2,4,5,6-tetra-n-propyl-1,3-benzenediamine, 2,3,5,6-tetraethyl-1,4-benzenediamine, 2,2'-methylenebis(6-n-propylbenzeneamine), 2,2'-methylenebis(3,6-di-n-propylbenzeneamine), 3,3'-methylenebis(2,6-di-n-butylbenzeneamine), 4,4'-methylenebis(2,6-diethylbenzeneamine), 4,4'-methylenebis(2,6-diisopropylbenzeneamine), 4,4'-methylenebis(2-isopropyl-6-methylbenzeneamine), 4,4'-(1,2-ethanediyl)bis(2,6-diethylbenzeneamine), 4,4'-(1,2-ethanediyl) bis(2,6-diisopropylbenzeneamine), 2,2'-methylenebis(3,4,6-tripentylbenzeneamine), 3,3'-methylenebis(2,5,6-trihexylbenzeneamine), 4,4'-methylenebis(2,3,6-trimethylbenzeneamine), 4,4'-methylenebis(2,3,4,6-tetramethylbenzeneamine), and the like. Of these more preferred types of aromatic primary diamines, particularly preferred are 4,4'-methylenebis(2,6-diethylbenzeneamine), 4,4'-methylenebis(2,6-diisopropylbenzeneamine), and a mixture of 2,4-diethyl-6-methyl-1,3-benzenediamine and 4,6-diethyl-2-methyl-1,3-benzenediamine (DETDA, Ethacure® 100).

Those of skill in the art will recognize that there are several ways to name the aromatic primary diamines used in this invention. For example, the structure

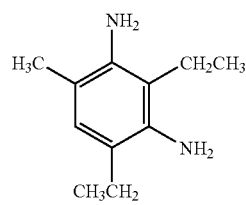

which represents a particularly preferred aromatic primary diamine in this invention, can be called 2,4-diethyl-6-methyl-1,3-benzenediamine, 2,4-diethyl-6-methyl-1,3-phenylenediamine, 3,5-diethyl-2,4-diaminotoluene, or 3,5-diethyl-toluene-2,4-diamine. Similarly, the structure

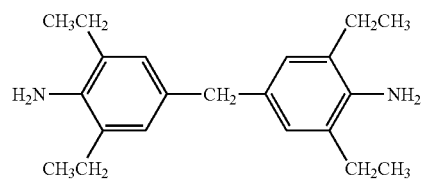

which represents another particularly preferred aromatic primary diamine in this invention, can be called 4,4'-methylenbis(2,6-diethylbenzeneamine), 4,4'-methylenbis(2,6-diethylaniline), or 3,3',5,5'-tetraethyl-4,4'-diaminodiphenylmethane.

2. Component (iii)

Component (iii) is an aliphatic secondary diamine having amino hydrocarbyl groups which are secondary or tertiary hydrocarbyl groups. The amino hydrocarbyl groups of the aliphatic secondary diamine can be cyclic or branched. Preferably, the amino hydrocarbyl groups are branched chain alkyl groups having from three to about twelve carbon atoms. Examples of suitable amino hydrocarbyl groups include isopropyl, sec-butyl, t-butyl, 3,3-dimethyl-2-butyl, 3-pentyl, cyclopentyl, 4-hexyl, cyclohexyl, methylcyclohexyl, cyclooctyl, 5-nonyl, and the like.

The aliphatic secondary diamines are hydrocarbyl secondary diamines where the hydrocarbyl portion of the diamine is aliphatic, where "hydrocarbyl portion" refers to the moiety to which the amino groups are bound. The hydrocarbyl portion of the aliphatic diamine can be cyclic, branched or a straight chain. Cyclic and straight chain are preferred as the hydrocarbyl portion of the aliphatic secondary diamine. When the hydrocarbyl portion of the diamine is cyclic, the cyclic moiety can be fused rings, bicyclic rings, or a tricyclic system (which tricyclic system can contain fused rings and/or bicyclic rings). The amino groups may be attached directly to the ring, or one or both amino groups may be bound to a group that is a substituent of the ring; it is preferred that at least one of the amino groups is bound to the ring. The aliphatic secondary diamine typically has about twelve to about forty carbon atoms; preferably, the aliphatic secondary diamine has about fifteen to about twenty-five carbon atoms. The relative proportions of aromatic primary diamine to aliphatic secondary diamine in the chain extender composition are preferably about 9:1 to about 1:9 on an equivalent basis; more preferably, the relative proportions on an equivalent basis are about 3:1 to about 2:3. On a weight basis, the relative proportions of aromatic primary diamine to aliphatic secondary diamine in the chain extender composition are preferably about 6:1 to about 1:6; more preferably, the relative proportions on a weight basis are about 2:1 to about 1:3.

Aliphatic secondary diamines that can be used in this invention include, but are not limited to, N,N'-di(1-cyclopropylethyl)-1,5-diaminopentane, N,N'-di(3,3-dimethyl-2-butyl)-1,5-diamino-2-methylpentane, N,N'-di-sec-butyl-1,6-diaminohexane, N,N'-dicyclohexyl-1,6-diaminohexane, N,N'-di(3-pentyl)-2,5-dimethyl-2,5-hexanediamine, N,N'-di-(2,4-dimethyl-3-pentyl)-1,3-cyclohexanebis(methylamine), N,N'-diisopropyl-1,7-diaminoheptane, N,N'-di-sec-butyl-1,8-diaminooctane, N,N'-di-(2-pentyl)-1,10-diaminodecane, N,N'-di-(3-hexyl)-1,12-diaminododecane, N,N'-di-(3-methyl-2-cyclohexenyl)-1,2-diaminopropane, N,N'-di-(2,5-dimethylcyclopentyl)-1,4-diamino-butane, N,N'-di(isophoryl)-1,5-diaminopentane, N,N'-di-(menthyl)-2,5-dimethyl-2,5-hexanediamine, and N,N'-di-(3,3-dimethyl-2-butyl)-3(4),8(9)-bis-(aminomethyl)-tricyclo[5.2.1.0 (2,6)]decane (also called N,N'-di-(3,3-dimethyl-2-butyl)-TCD diamine). Preferred aliphatic secondary diamines include N,N'-di-(3,3-dimethyl-2-butyl)-1,6-diaminohexane, N,N'-dicyclohexyl-1,6-diaminohexane, and N,N'-di-(3,3-dimethyl-2-butyl)-TCD diamine.

Relative proportions of aromatic primary diamine to aliphatic secondary diamine are can be about 5:1 to about 1:5 on an equivalent basis. Preferably, the relative proportions of aromatic primary diamine to aliphatic secondary diamine on an equivalent basis are about 3:1 to about 1:3.

The relative proportions of the polyol and/or polyetheramine to the chain extender are usually in the range of about 1:1 to about 1:4, and preferably are in the range of about 1:1.5 to about 1:3.

D. Other Ingredients

Other ingredients that may optionally be used include, but are not limited to, flame retardants or flame suppressant agents, catalysts, solvents, diluents, moisture scavenging agents, accelerators, antioxidants, coupling agents, stabilizers, lubricants, surfactants, emulsifiers, viscosity control agents, plasticizers, biocides, antistatic agents, fillers, fibrous reinforcing agents such as chopped glass fibers, pigments, dyes, blowing agents, foaming agents, thixotropic agents, cell regulators, and polymeric and resin additives. When the polyurea or polyurethane-urea polymer is formed via reaction injection molding, the optional ingredients also include internal and/or external mold release agents.

II. Processes of the Invention

In the processes of the invention, the "A side" reactant comprises the polyisocyanate, and the "B side" reactant comprises the polyol and/or polyetheramine in admixture with the diamine chain extender together with any optional ingredients. In some processes of the invention, the polyisocyanate is mixed with polyol and/or polyetheramine to form a quasiprepolymer. When a quasiprepolymer is used, the quasiprepolymer is at least part of the side A reactant; the B side reactant still comprises polyol and/or polyetheramine in admixture with the diamine chain extender. In the practice of this invention, use of quasiprepolymers is preferred way of producing polyureas.

A. Spray Coating

Coatings of the present invention are prepared by using a high-pressure impingement spray apparatus designed to mix and spray a two-component liquid chemical system. The liquid system is made up of a polyisocyanate (A side) with a polyol and/or polyetheramine and chain extender (B side), which A side and B side components are mixed in the apparatus under high pressure and sprayed onto a substrate so as to form a polyurea or polyurea-urethane coating on the substrate. Coating thicknesses as low as about 0.03 inches (0.08 cm) can be obtained. Generally, coatings of this invention have thicknesses in the range of about 0.05 inches to about 0.125 inches (0.32 cm), although coatings deviating from these thicknesses are within the scope of the invention. Coatings with desirable gel times can be obtained without adversely affecting the coating's properties, such as sandability, durability, cure temperature, appearance of the coating, and application parameters such as sprayability. The reactants may be sprayed to produce coatings on a variety of substances, including glass or synthetic fibers, woven or nonwoven substrates, wood, concrete, stone, and metal, including metal foil and steel. If desired, the substrate may be heated prior to and/or during the application of the reactants.

In spray coating, the polyisocyanate (A side) and polyol and/or polyetheramine and chain extender (B side) generally are placed in separate containers and then are sprayed by a variable or fixed spray nozzle together onto a substrate. Normally and preferably, the A side reactant and the B side reactant are sprayed at substantially equal volumes (e.g., a 1:1 volume ratio). Other volume ratios, such as substantially 2:1 (A side to B side), are possible and within the scope of this invention.

It cannot be stressed strongly enough that one must not gain the impression that inconsequential variations in one or both streams cannot occur. Interruptions which do not materially affect the conduct of the process are not excluded from the scope of this invention. To safeguard against hypertechnical legalistic word interpretation, it has been deemed prudent to employ terms such as "substantially equal" and "substantially 2:1" in describing this invention. But whatever the terms used, the process should be conducted as one of ordinary skill in the art would carry out the processes after a thorough, unbiased reading of this entire disclosure and in keeping with the spirit of the invention gained from such a reading.

Desired gel times vary with the particular substrate and application of the coating being formed, but gel times of about 2 seconds to about 50 seconds are typical. Preferred gel times again can vary, but are often in the range of about 6 seconds to about 15 seconds. As mentioned above, changing the components of the chain extender and/or their relative proportions can alter the gel time for the coating.

B. Reaction Injection Molding

Articles of the present invention are prepared by reaction injection molding. In reaction injection molding, a polyisocyanate (A side reactant) and a polyol and/or polyetheramine together with a chain extender (B side reactant) are brought together, injected into a mold, and exposed to conditions such that a solidified article is prepared. Thereafter the solidified article is removed from the mold.

More specifically, the reaction injection molding process comprises bringing together the A side and B side reactants, usually prior to injection. The bringing together can occur in a mixing head from which the mixture is injected into the mold. It is recommended and preferred that the reactants are fed so that they are brought together in a desired weight ratio. The reactants react rapidly after mixing to form polyurea or polyurethane/polyurea polymers; in reaction injection molding, it is intended that the polymers form primarily in the mold to form a molded article. The reactants are usually stored in separate vessels prior to molding.

Desired gel times vary with the particular application of the article being formed, but gel times of about 1 second to about 20 seconds are typical. Preferred gel times again can vary, but are often in the range of about 2 seconds to about 6 seconds. As mentioned above, changing the components of the chain extender and/or their relative proportions can alter the gel time for forming the article.

The following examples are presented for purposes of illustration, and are not intended to impose limitations on the scope of this invention.

In the following Examples, the reactants were sprayed with a two-part proportioning spray machine (Graco, Inc., model # E-XP2), fitted with 2.5 gallon (9.5 L) feed tanks, 60 feet (18 m) of 0.25-inch (6.35 mm) inner diameter high pressure hoses and an internal mechanical multi-feed mixing spray gun (Graco, Inc., Fusion MP). A direct impingement mixing module (Graco, Inc., model # XF1818) was used, and the spray nozzle was a metal alloy (Graco, Inc., CeramTip # 424). This apparatus is designed to deliver a 1:1 volume ratio of the A and B sides.

EXAMPLE 1 (COMPARATIVE)

The B side reactant was made by mixing together two polyetheramines, Jeffamine® D-2000 and Jeffamine® T-5000 (Huntsman Polyurethanes), a mixture of 2,4-diethyl-6-methyl-1,3-benzenediamine and 4,6-diethyl-2-methyl-1,3-benzenediamine (Ethacure® 100, Albemarle Corporation), and N,N'-di-(sec-butyl)-4,4'-methylenebis-(benzeneamine) (Unilink® 4200, Dorf Ketal Ltd.). Proportions in the B side were varied in each run; see Table 1. Each ingredient was weighed to the nearest 0.1 gram into a lined 5-gallon (~22 L) can fitted with a bung lid. A 12 kilogram batch was made. After all of the ingredients had been placed in the 5-gallon can, the can was sealed and placed on a horizontal drum roller and rolled for four hours at ambient temperature until the mixture inside was uniform.

The A side reactant was a quasiprepolymer of 2,4-methylenediphenyl diisocyanate (MDI) and Jeffamine® D-2000, which quasiprepolymer is sold as Rubinate® 9480 (Huntsman Polyurethanes).

The B side reactant was loaded into a tank of the spray machine and a pad of nitrogen (55 psi) was placed in the tank. The A side reactant was loaded into another tank of the spray machine and a pad of nitrogen (55 psi, $3.79 \times 10^5$ Pa) was placed in the tank. The hoses were purged of air with nitrogen, and 4-5 liters of material was flushed through the hoses to remove any remnants of previous systems that were used. The reactants in the tanks were heated to 50° C. and the mixing/spray pressure was set at 2100 psi ($1.45 \times 10^7$ Pa).

The gel time was measured by spraying an amount of the liquid reaction mixture onto a vertical panel, while measuring the time from spray impingement until the coating no longer ran.

Panel molds were made by using a metal panel with a polished surface that had been fitted with four 0.125-inch (3.18 mm) thick bars to create dams on four sides. The molds were pretreated with a silicone material (Chesterton 983, a mold release agent) to facilitate coating removal. Sample panels were produced by spraying, in multiple passes, the mixture of reactants onto panel molds while the panel molds were in horizontal positions. The coatings were allowed to cure at room temperature in the panel mold until they could be removed without distorting the resultant panels (~1-2 hr.). After 24 hours, test parts were stamped from the panels according to dimensions for each applicable ASTM test. The test parts were aged at 75° F. (+/−5° F.) (~24° C.+/−2.8° C.) for two weeks before testing.

Results are summarized in Table 1. Each sample shown is an average of three runs, with four samples used for each run. Sample 1 was too fast to spray. Results outside two standard deviations were not used to determine the values shown in Table 1.

TABLE 1

|  | Sample 1 | Sample 2 | Sample 3 | Sample 4 | ASTM method |
|---|---|---|---|---|---|
| B side ingredients | | Parts per hundred A side | | | |
| Ethacure ® 100 | 24.75 | 18.85 | 15.99 | 12.79 | |
| Unilink ® 4200 | 0 | 10.94 | 16.33 | 22.28 | |
| Jeffamine D-2000 | 57.44 | 52.37 | 49.84 | 47.64 | |
| Jeffamine T-5000 | 4.51 | 5.63 | 5.63 | 4.51 | |
| E-100:U-4200 (equivalents) | 100:0 | 75:25 | 63:37 | 50:50 | |
| A side ingredient | | Isocyanate index | | | |
| Rubinate ® 9480 | 1.05 | 1.05 | 1.05 | 1.05 | |
| Properties | | | | | |
| Gel time | <1 sec. | 6 sec. | 9 sec. | 15 sec. | |
| Shore A hardness | — | 90 | 89 | 84 | D-2240 |
| Tensile strength | — | 1895 psi ($1.31 \times 10^7$ Pa) | 1591 psi ($1.10 \times 10^7$ Pa) | 1559 psi ($1.07 \times 10^7$ Pa) | D-412 |
| Modulus (100%) | — | 1177 psi ($0.81 \times 10^7$ Pa) | 857 psi ($0.59 \times 10^7$ Pa) | 839 psi ($0.58 \times 10^7$ Pa) | D-412 |
| Modulus (300%) | — | — | 1552 psi ($1.07 \times 10^7$ Pa) | 1552 psi ($1.07 \times 10^7$ Pa) | D-412 |
| Elongation, % | — | 258% | 316% | 310% | D-412 |
| Tear strength, die C | — | 334 pli ($5.85 \times 10^4$ N/m) | 338 pli ($5.92 \times 10^4$ N/m) | 344 pli ($6.02 \times 10^4$ N/m) | D-624 |

EXAMPLE 2

The procedures of Example 1 were repeated, except that the chain extender (in the B side) was Ethacure® 100 and N,N'-di-(3,3-dimethyl-2-butyl)-1,6-diaminohexane. Results are summarized in Table 2. Each sample shown is an average of three runs, with four samples used for each run.

TABLE 2

| | Sample 5 | Sample 6 | Sample 7 | ASTM method |
|---|---|---|---|---|
| B side ingredients | Parts per hundred A side | | | |
| Ethacure ® 100 | 18.82 | 15.97 | 12.72 | |
| N,N'-di-(3,3-dimethyl-2-butyl)-1,6-diaminohexane | 9.98 | 14.78 | 20.27 | |
| Jeffamine D-2000 | 57.44 | 52.37 | 49.84 | |
| Jeffamine T-5000 | 4.51 | 5.63 | 5.63 | |
| E-100:N,N'-di-(3,3-dimethyl-2-butyl)-1,6-diaminohexane (equivalents) | 75:25 | 63:37 | 50:50 | |
| A side ingredient | Isocyanate index | | | |
| Rubinate ® 9480 | 1.05 | 1.05 | 1.05 | |
| Properties | | | | |
| Gel time | 4 sec. | 7 sec. | 11 sec. | |
| Shore A hardness | 88 | 90 | 91 | D-2240 |
| Tensile strength | 1953 psi ($1.35 \times 10^7$ Pa) | 1916 psi ($1.32 \times 10^7$ Pa) | 1612 psi ($1.11 \times 10^7$ Pa) | D-412 |
| Modulus (100%) | 1037 psi ($7.15 \times 10^6$ Pa) | 990 psi ($6.82 \times 10^6$ Pa) | 892 psi ($6.15 \times 10^6$ Pa) | D-412 |
| Modulus (300%) | 1903 psi ($1.31 \times 10^7$ Pa) | 1809 psi ($1.25 \times 10^7$ Pa) | 1547 psi ($1.07 \times 10^7$ Pa) | D-412 |
| Elongation, % | 316% | 322% | 326% | D-412 |
| Tear strength, die C | 353 pli ($6.18 \times 10^4$ N/m) | 339 pli ($5.93 \times 10^4$ N/m) | 332 pli ($5.81 \times 10^4$ N/m) | D-624 |

It is to be understood that the reactants and components referred to by chemical name or formula anywhere in this document, whether referred to in the singular or plural, are identified as they exist prior to coming into contact with another substance referred to by chemical name or chemical type (e.g., another reactant, a solvent, or etc.). It matters not what preliminary chemical changes, transformations and/or reactions, if any, take place in the resulting mixture or solution or reaction medium as such changes, transformations and/or reactions are the natural result of bringing the specified reactants and/or components together under the conditions called for pursuant to this disclosure. Thus the reactants and components are identified as ingredients to be brought together in connection with performing a desired chemical operation or reaction or in forming a mixture to be used in conducting a desired operation or reaction. Also, even though an embodiment may refer to substances, components and/or ingredients in the present tense ("is comprised of", "comprises", "is", etc.), the reference is to the substance, component or ingredient as it existed at the time just before it was first contacted, blended or mixed with one or more other substances, components and/or ingredients in accordance with the present disclosure.

Except as may be expressly otherwise indicated, the article "a" or "an" if and as used herein is not intended to limit, and should not be construed as limiting, the description or a claim to a single element to which the article refers. Rather, the article "a" or "an" if and as used herein is intended to cover one or more such elements, unless the text expressly indicates otherwise.

Also, even though the claims may refer to substances in the present tense (e.g., "comprises", "is", etc.), the reference is to the substance as it exists at the time just before it is first contacted, blended or mixed with one or more other substances in accordance with the present disclosure.

Each and every patent or other publication or published document referred to in any portion of this specification is incorporated in toto into this disclosure by reference, as if fully set forth herein.

This invention is susceptible to considerable variation within the spirit and scope of the appended claims.

The invention claimed is:

1. A spray coating which is formed from ingredients comprising at least (A) an aromatic polyisocyanate; and (B) a mixture formed from components comprised of
   (i) at least one polyol and/or at least one polyetheramine,
   (ii) an aromatic primary diamine, and
   (iii) N,N'-di-(3,3-dimethyl-2-butyl)-1,6-diaminohexane or N,N'-dicyclohexyl-1,6-diaminohexane.

2. A coating as in claim 1 wherein
   (ii) is an aromatic primary diamine in which each position ortho to an amino group bears a hydrocarbyl group, and which aromatic primary diamine is in the form of one phenyl ring having two amino groups on the ring, which amino groups are meta or para relative to each other.

3. A coating as in claim 1 wherein
   (ii) is a mixture of 2,4-diethyl-6-methyl-1,3-benzenediamine and 4,6-diethyl-2-methyl-1,3-benzenediamine.

4. A coating as in claim 1 wherein said polyisocyanate is 4,4-methylenediphenyl diisocyanate, 2,4-methylenediphenyl diisocyanate, or a mixture thereof.

5. A process for forming a spray coating, which process comprises bringing together at least
   (A) at least one aromatic polyisocyanate; and
   (B) a mixture formed from components comprised of
      (i) at least one polyol and/or at least one polyetheramine,
      (ii) an aromatic primary diamine, and
      (iii) N,N'-di-(3,3-dimethyl-2-butyl)-1,6-diaminohexane or N,N'-dicyclohexyl-1,6-diaminohexane;
   and spraying said mixture onto a surface.

6. A process as in claim 5 wherein
(ii) is an aromatic primary diamine in which each position ortho to an amino group bears a hydrocarbyl group, and which aromatic primary diamine is in the form of one phenyl ring having two amino groups on the ring, which amino groups are meta or para relative to each other.

7. A process as in claim 5 wherein
(ii) is a mixture of 2,4-diethyl-6-methyl-1,3-benzenediamine and 4,6-diethyl-2-methyl-1,3-benzenediamine.

8. A process as in claim 5 wherein said polyisocyanate is 4,4-methylenediphenyl diisocyanate, 2,4-methylenediphenyl diisocyanate, or a mixture thereof.

9. An article formed by reaction injection molding, which article is formed from ingredients comprising at least (A) an aromatic polyisocyanate and (B) a mixture formed from components comprised of
(i) at least one polyol and/or at least one polyetheramine,
(ii) an aromatic primary diamine, and
(iii) N,N'-di-(3,3-dimethyl-2-butyl)-1,6-diaminohexane or N,N'-dicyclohexyl-1,6-diaminohexane.

10. An article as in claim 9 wherein
(ii) is an aromatic primary diamine in which each position ortho to an amino group bears a hydrocarbyl group, and which aromatic primary diamine is in the form of one phenyl ring having two amino groups on the ring, which amino groups are meta or para relative to each other, and/or
the hydrocarbyl portion of the aliphatic secondary diamine is a straight chain.

11. An article as in claim 9 wherein
(ii) is a mixture of 2,4-diethyl-6-methyl-1,3-benzenediamine and 4,6-diethyl-2-methyl-1,3-benzenediamine.

12. An article as in claim 9 wherein said polyisocyanate is 4,4-methylenediphenyl diisocyanate, 2,4-methylenediphenyl diisocyanate, or a mixture thereof.

13. A process for preparing a reaction injection molding product, which process comprises
I) bringing together at least (A) an aromatic polyisocyanate and (B) a mixture formed from components comprised of
(i) at least one polyol and/or at least one polyetheramine,
(ii) an aromatic primary diamine, and
(iii) N,N'-di-(3,3-dimethyl-2-butyl)-1,6-diaminohexane or N,N'-dicyclohexyl-1,6-diaminohexane,
forming a molding mixture;
II) injecting said molding mixture formed in I) into a mold to form a molded product; and
III) opening the mold and removing the product formed in II).

14. A process as in claim 13 wherein
(ii) is an aromatic primary diamine in which each position ortho to an amino group bears a hydrocarbyl group, and which aromatic primary diamine is in the form of one phenyl ring having two amino groups on the ring, which amino groups are meta or para relative to each other, and/or
the hydrocarbyl portion of the aliphatic secondary diamine is a straight chain.

15. A process as in claim 13 wherein
(ii) is a mixture of 2,4-diethyl-6-methyl-1,3-benzenediamine and 4,6-diethyl-2-methyl-1,3-benzenediamine.

16. A process as in claim 13 wherein (i) is at least one polyetheramine and/or wherein said polyisocyanate is 4,4-methylenediphenyl diisocyanate, 2,4-methylenediphenyl diisocyanate, or a mixture thereof.

* * * * *

UNITED STATES PATENT AND TRADEMARK OFFICE
CERTIFICATE OF CORRECTION

| | | |
|---|---|---|
| PATENT NO. | : 8,143,365 B2 | Page 1 of 1 |
| APPLICATION NO. | : 12/444870 | |
| DATED | : March 27, 2012 | |
| INVENTOR(S) | : William R. Brown, Paul L. Wiggins and John Y. Lee | |

It is certified that error appears in the above-identified patent and that said Letters Patent is hereby corrected as shown below:

Front page, right Column, under the heading FOREIGN PATENT DOCUMENTS, the following documents were not listed and should read:

-- CN 1352202      6/2002
   CN 1939949      4/2007
   DE 2940738      4/1983
   DE 3728141      3/1989
   DE 102005046641 4/2007
   DE 1163315      2/1964
   EP 0014985      9/1980
   JP 63052146     3/1988
   JP 5274914      10/1993
   WO 2000/26181   5/2000 --.

Signed and Sealed this

Seventeenth Day of July, 2012

David J. Kappos
*Director of the United States Patent and Trademark Office*